(12) United States Patent
Asakura et al.

(10) Patent No.: US 12,304,292 B2
(45) Date of Patent: May 20, 2025

(54) VEHICLE MOUNTING STRUCTURE FOR ELECTRIC UNIT

(71) Applicant: NISSAN MOTOR CO., LTD., Yokohama (JP)

(72) Inventors: Daisuke Asakura, Kanagawa (JP); Takashi Kurita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 304 days.

(21) Appl. No.: 17/908,728

(22) PCT Filed: Mar. 4, 2020

(86) PCT No.: PCT/JP2020/009192
§ 371 (c)(1),
(2) Date: Sep. 1, 2022

(87) PCT Pub. No.: WO2021/176603
PCT Pub. Date: Sep. 10, 2021

(65) Prior Publication Data
US 2023/0120938 A1    Apr. 20, 2023

(51) Int. Cl.
*B60K 1/00* (2006.01)
*B62D 21/15* (2006.01)

(52) U.S. Cl.
CPC ............... *B60K 1/00* (2013.01); *B62D 21/155* (2013.01)

(58) Field of Classification Search
CPC ........ B60K 1/00; B62D 21/155; B62D 21/11; B62D 21/152; B62D 65/18; B62D 25/08; B60Y 2306/01; B60Y 2400/61; B60Y 2410/10; H02M 7/003; H02M 1/32
See application file for complete search history.

(56) References Cited

U.S. PATENT DOCUMENTS

| | | | |
|---|---|---|---|
| 7,669,688 B2 * | 3/2010 | Yamaguchi | B62D 21/152 180/312 |
| 9,205,749 B2 * | 12/2015 | Sakamoto | B60L 15/2009 |
| 2003/0011184 A1 | 1/2003 | Sonomura et al. | |

(Continued)

FOREIGN PATENT DOCUMENTS

| | | | |
|---|---|---|---|
| DE | 102019002655 A1 * | 10/2019 | |
| JP | 2002362167 A * | 12/2002 | B60K 5/1216 |
| JP | 2006088871 A | 4/2006 | |

(Continued)

OTHER PUBLICATIONS

DE-102019002655-A1 English Translation (Year: 2019).*

(Continued)

*Primary Examiner* — James A Shriver, II
*Assistant Examiner* — Michael T. Walsh
(74) *Attorney, Agent, or Firm* — Foley & Lardner LLP

(57) ABSTRACT

A vehicle mounting structure for an electric unit 1 includes a side member 10, a suspension member 5 including a high rigidity portion 5a and a low rigidity portion 5b in a vehicle front-rear direction, and an electric unit 1 in which an inverter 2 and a motor 3 are integrated. The side member 10 includes a curved portion 10c having an upwardly convex curved shape. The curved portion 10c is disposed at a position overlapping with the inverter 2 in the vehicle front-rear direction. The electric unit 1 is fixed to the low rigidity portion 5b.

5 Claims, 2 Drawing Sheets

(56) References Cited

U.S. PATENT DOCUMENTS

2011/0132676 A1* 6/2011 Kodaira ................. B62D 21/17
  180/65.1
2015/0107920 A1 4/2015 Sakamoto

FOREIGN PATENT DOCUMENTS

| JP | 2011-152841 A |   | 8/2011  |           |
|----|---------------|---|---------|-----------|
| JP | 2012-096746 A |   | 5/2012  |           |
| JP | 2013095152 A  | * | 5/2013  | B60H 1/3223 |
| JP | 2017065439 A  | * | 4/2017  |           |
| JP | 2019018685 A  | * | 2/2019  |           |
| JP | 2019188884 A  | * | 10/2019 |           |

OTHER PUBLICATIONS

JP-2002362167-A English Translation (Year: 2002).*
JP-2006088871-A English Translation (Year: 2006).*
JP-2013095152-A English Translation (Year: 2013).*
JP-2019188884-A English Translation (Year: 2019).*

* cited by examiner

VEHICLE MOUNTING STRUCTURE FOR ELECTRIC UNIT

TECHNICAL FIELD

The present invention relates to a vehicle mounting structure for an electric unit.

BACKGROUND ART

JP 2012-96746 A discloses a structure in which an inverter is disposed in the vicinity of a side member.

SUMMARY OF INVENTION

The side member includes a low rigidity portion, and attenuates energy by deforming a shape thereof at the time of a vehicle collision. However, when the inverter is disposed in the vicinity of the side member, the deformed side member interferes with the inverter, and the inverter is broken. As a result, there is a risk that insulation of a high-voltage terminal connection portion of the inverter is broken, that is, the high-voltage terminal connection portion is short-circuited.

The present invention has been made in view of such a problem, and an object of the present invention is to prevent insulation breakage of an inverter due to interference of a side member at the time of a vehicle collision.

According to an aspect of the present invention, a vehicle mounting structure for an electric unit includes a side member, a suspension member including a high rigidity portion and a low rigidity portion in a vehicle front-rear direction, and an electric unit in which an inverter and a first motor are integrated. The side member includes a curved portion having an upwardly convex curved shape. The curved portion is disposed at a position overlapping with the inverter in the vehicle front-rear direction. The electric unit is fixed to the low rigidity portion.

DESCRIPTION OF EMBODIMENTS

Hereinafter, an embodiment of the present invention will be described with reference to the accompanying drawings.

Figure 1:
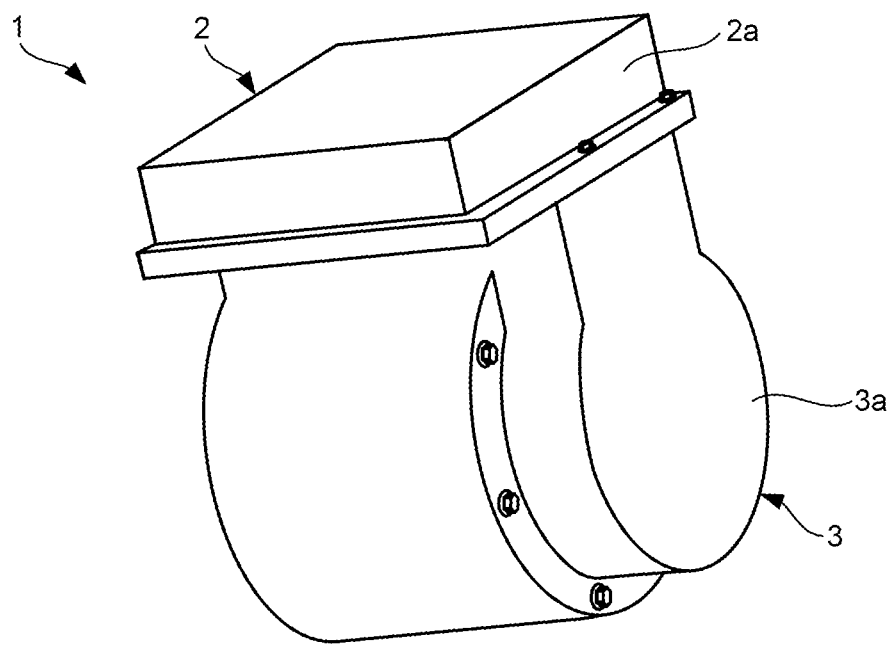
FIG. 1 is an external view of an electric unit.
Figure 2:
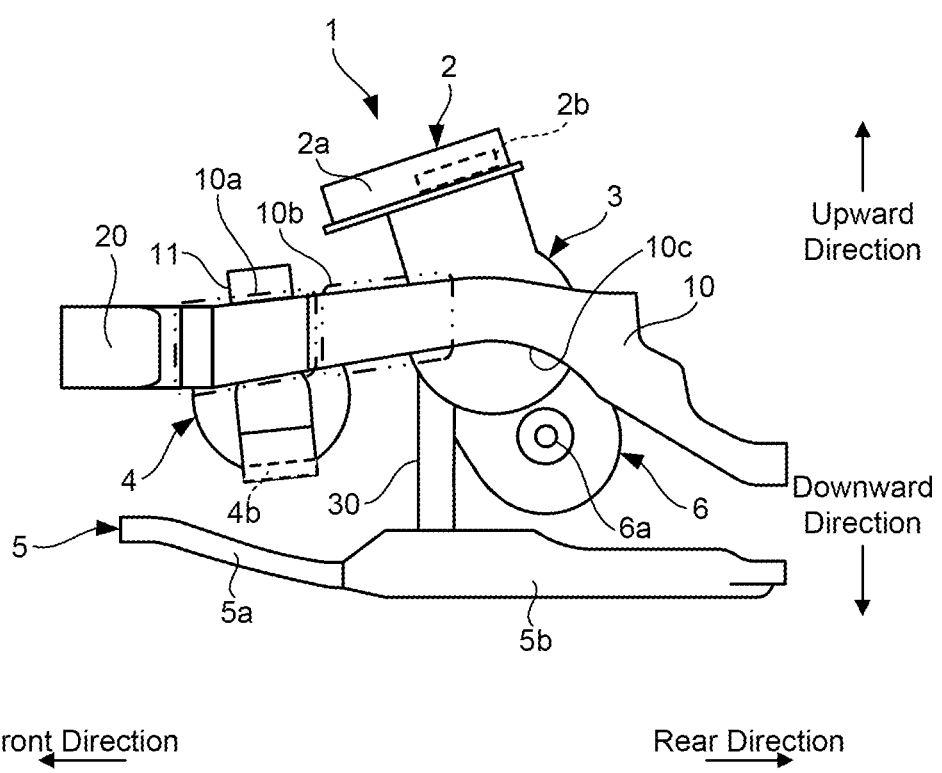
FIG. 2 is a schematic configuration view of a vehicle mounting structure for the electric unit according to an embodiment.
Figure 3:
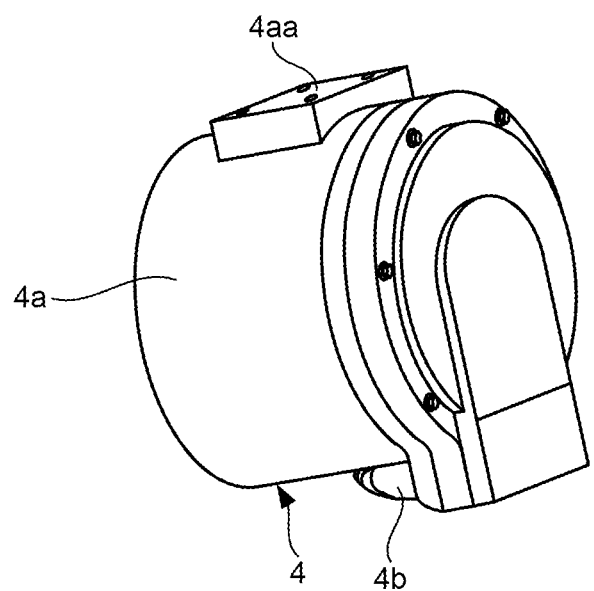
FIG. 3 is an external view of a generator.

FIG. 1 is an external view of an electric unit 1. FIG. 2 is a schematic configuration view of a mounting structure for the electric unit 1 according to the present embodiment. FIG. 3 is an external view of a generator 4. As shown in FIG. 1, the electric unit 1 includes an inverter 2 and a motor 3. The electric unit 1 is to be mounted on a vehicle. The vehicle is a series hybrid vehicle that travels by driving the motor 3 constituting a drive source of the vehicle using electric power generated by the generator 4 which is driven by power of an internal combustion engine. The inverter 2 is disposed above the motor 3 and has an integrated structure with the motor 3. A case 2a of the inverter 2 is fixed to a case 3a of the motor 3 by bolt fastening. The motor 3 corresponds to a first motor.

As shown in FIG. 2, the electric unit 1 is fixed to a suspension member 5 via a support portion 30. The support portion 30 supports the electric unit 1 from below. The electric unit 1 is disposed to be inclined forward with respect to the vehicle.

The suspension member 5 includes a high rigidity portion 5a and a low rigidity portion 5b in a vehicle front-rear direction. The high rigidity portion 5a is a portion having rigidity higher than that of the low rigidity portion 5b, and in the present embodiment, carbon steel is used for the high rigidity portion 5a and aluminum alloy is used for the low rigidity portion 5b. The high rigidity portion 5a may be set, for example, by using a cross-sectional structure thicker than that of the low rigidity portion 5b, or by providing a beam on an inner side of the vehicle in a vehicle lateral direction, that is, on an inner side portion of the suspension member 5.

The high rigidity portion 5a has a shape extending obliquely downward toward a rear of the vehicle. The low rigidity portion 5b is disposed behind the high rigidity portion 5a. The high rigidity portion 5a is disposed at a front portion including a front end portion of the suspension member 5. The low rigidity portion 5b is disposed to be continuous with the high rigidity portion 5a. The electric unit 1 is fixed to the low rigidity portion 5b via the support portion 30.

The inverter 2 is disposed above a side member 10. The inverter 2 includes a high-voltage bus bar 2b in the case 2a. The high-voltage bus bar 2b is a high-voltage terminal connection portion and is connected to the motor 3. In the high-voltage bus bar 2b, a high-voltage terminal has a bus bar structure, and is only partially insulated. Therefore, the high-voltage bus bar 2b is considered to be a portion which is most desired to avoid interference with the side member 10 from the viewpoint of ensuring insulation at the time of a vehicle collision.

The side member 10 is connected to a bumper reinforcement 20 at a front of the vehicle, and extends from the bumper reinforcement 20 toward the rear of the vehicle. The side member 10 is disposed above the suspension member 5.

The side member 10 includes a high rigidity portion 10a and a low rigidity portion 10b in the vehicle front-rear direction. The high rigidity portion 10a is a portion having rigidity higher than that of the low rigidity portion 10b. The high rigidity portion 10a is set, for example, by using a material having a cross-sectional structure thicker than that of the low rigidity portion 10b, by using a material having a higher strength than that of the low rigidity portion 10b, or by providing a beam on the inner side of the vehicle in the vehicle lateral direction, that is, on an inner side portion of the side member 10.

The low rigidity portion 10b is disposed behind the high rigidity portion 10a. The low rigidity portion 10b is disposed to be continuous with the high rigidity portion 10a. The low rigidity portion 10b has a longitudinal cross-sectional shape when viewed from the front of the vehicle. Therefore, the low rigidity portion 10b is relatively easily bent in the vehicle lateral direction at the time of the vehicle collision. The longitudinal cross-sectional shape contributes to securing a wide space in a motor room of the vehicle.

The high rigidity portion 10a is disposed at a position overlapping with the high rigidity portion 5a of the suspension member 5 in the vehicle front-rear direction. The high rigidity portion 10a is disposed within a range in which the high rigidity portion 5a is provided in the vehicle front-rear direction. The high rigidity portion 5a corresponds to a first high rigidity portion, and the high rigidity portion 10a corresponds to a second high rigidity portion. The high rigidity portion 10a is disposed at a front end portion of the side member 10.

As shown in FIGS. 2 and 3, the generator 4 has a separate structure from the electric unit 1. The generator 4 is fixed to the side member 10 via a bracket 11. The generator 4 is fixed in a state of being suspended from the side member 10 by the bracket 11. The motor 3 is provided with a speed reducer 6. The motor 3 transfers power to an output shaft 6a via the speed reducer 6, and the power is transferred to drive wheels of the vehicle via the output shaft 6a and further, a drive shaft of the vehicle connected to the output shaft 6a. The output shaft 6a is located below the motor 3. The output shaft 6a and the drive shaft are located below the side member 10 and above the suspension member 5. The drive shaft can be disposed coaxially with the output shaft 6a.

The bracket 11 is fixed, by bolt fastening, to a fixing portion 4aa provided on the case 4a of the generator 4, and is fixed to the high rigidity portion 10a of the side member 10 by bolt fastening. The bracket 11 is fixed to an upper surface of the side member 10. The generator 4 is fixed to the high rigidity portion 10a of the side member 10 via the bracket 11.

The generator 4 is connected with a high-voltage connector 4b. The high-voltage connector 4b is a connector for connecting the inverter 2 and the generator 4, and is disposed below the side member 10. The high-voltage connector 4b is connected, from the inner side of the vehicle, to a lower portion of the generator 4 in a state of being mounted on the vehicle. The high-voltage connector 4b is disposed above the suspension member 5. The generator 4 corresponds to a second motor.

The side member 10 includes a curved portion 10c. The curved portion 10c has an upwardly convex curved shape, and is disposed at a position overlapping with the inverter 2 in the vehicle front-rear direction. The side member 10 extends obliquely downward from the curved portion 10c in the vehicle front-rear direction, and has a curved structure curved in a substantially arch shape as a whole. The curved portion 10c is provided at a position overlapping the drive shaft of the vehicle connected to the output shaft 6a in the vehicle front-rear direction. The curved portion 10c is provided to avoid interference with the drive shaft of the vehicle, thereby securing a space for disposing the drive shaft.

Next, the main functions and effects of the present embodiment will be described.

Figure 4:
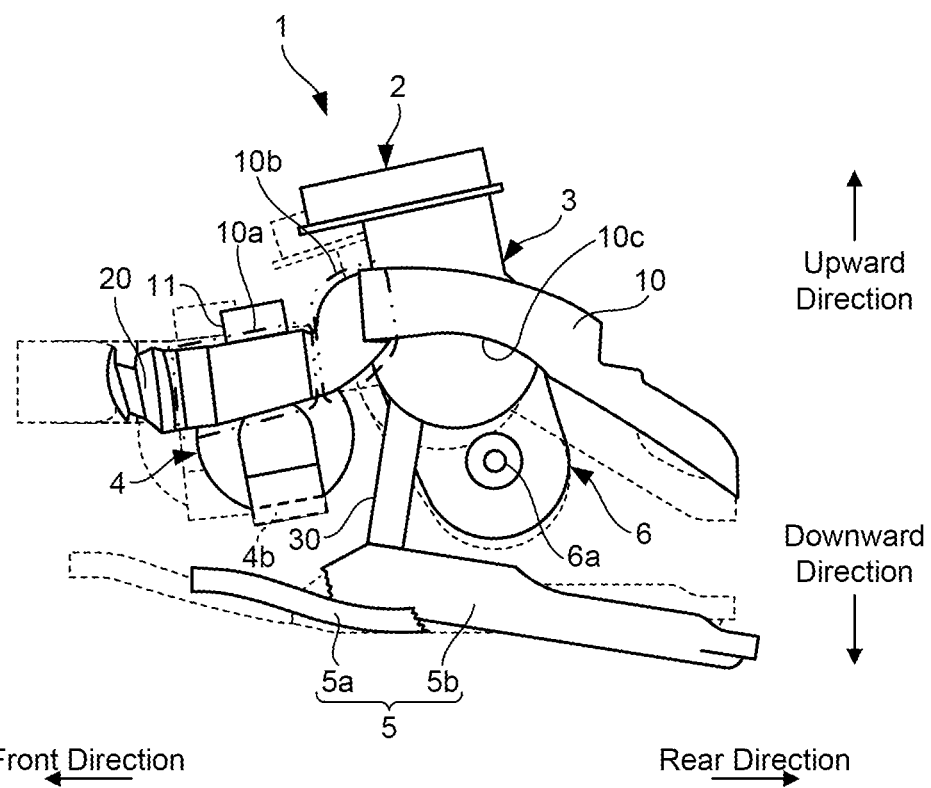
FIG. 4 is a view showing a state around a side member at the time of a vehicle collision.

FIG. 4 is a view showing a state around the side member 10 at the time of the vehicle collision. Broken lines indicate a state before the vehicle collision. When the vehicle collides, the low rigidity portion 10b of the side member 10 bends in the vehicle lateral direction, and absorbs energy. At this time, a portion of the low rigidity portion 10b on the front of the vehicle is bent toward the inner side of the vehicle. The suspension member 5 moves toward the rear of the vehicle.

At this time, if the suspension member 5 is not broken, the electric unit 1 remains fixed to the suspension member 5, and the inverter 2 cannot move upward in a direction away from the side member 10. Therefore, there is a concern that the side member 10 bent inward may interfere with the inverter 2. If the insulation of the inverter 2 is broken at this time, there is a concern that a short circuit may occur at a high voltage, and the safety against electric shock prevention may be impaired.

In particular, in the present embodiment, the side member 10 includes the curved portion 10c, and the curved portion 10c is disposed at the position overlapping with the inverter 2 in the vehicle front-rear direction. In this case, as a result of the side member 10 being easily bent upward in a convex manner at the time of the vehicle collision, a probability that the low rigidity portion 10b is bent toward the inner side of the vehicle and interferes with the inverter 2 increases.

The vehicle mounting structure for the electric unit 1 according to the present embodiment includes the side member 10, the suspension member 5 including the high rigidity portion 5a and the low rigidity portion 5b in the vehicle front-rear direction, and the electric unit 1 in which the inverter 2 and the motor 3 are integrated. The side member 10 includes the curved portion 10c, and the curved portion 10c is disposed at the position overlapping with the inverter 2 in the vehicle front-rear direction. The electric unit 1 is fixed to the low rigidity portion 5b.

According to such a configuration, at the time of the vehicle collision, the high rigidity portion 5a moves rearward without being broken. When the high rigidity portion 5a pushes the low rigidity portion 5b, a base portion of the high rigidity portion 5a continuing to the low rigidity portion 5b is pulled, and the low rigidity portion 5b is broken. As a result, the electric unit 1 is brought into a free state due to the breakage of the low rigidity portion 5b, and is moved upward to be pushed up. Accordingly, the inverter 2 moves in the direction away from the side member 10, and thus interference between the inverter 2 and the side member 10 that is bent toward the inner side of the vehicle at the time of the vehicle collision is avoided. Further, when the electric unit 1 remains fixed to the suspension member 5, the electric unit 1 may move toward the rear of the vehicle and interfere with a dash cross that separates a vehicle compartment and the motor room, but such a situation is also avoided. The fact that the generator 4 is disposed below the motor 3 also contributes to the pushing up of the electric unit 1 in the free state.

Further, according to such a configuration, the electric unit 1 in the free state due to the breakage of the low rigidity portion 5b at the time of the vehicle collision moves upward, and thus the side member 10 that bends upward in a convex manner at the time of the vehicle collision can be avoided from interfering with the inverter 2.

In the present embodiment, the high rigidity portion 5a has the shape extending obliquely downward toward the rear of the vehicle.

According to such a configuration, the high rigidity portion 5a moves rearward and downward with a space at the time of the vehicle collision, and a shearing force acts on the low rigidity portion 5b, and as a result, the low rigidity portion 5b can be easily broken. Accordingly, this configuration can also contribute to the pushing up of the electric unit 1 in the free state.

The vehicle mounting structure for the electric unit 1 according to the present embodiment further includes the side member 10, and the inverter 2 is disposed above the side member 10.

According to such a configuration, the interference between the side member 10 and the inverter 2 that is constituted by a high-voltage component at the time of the vehicle collision can be avoided more reliably.

In the present embodiment, the side member 10 includes the high rigidity portion 10a whose position overlaps with the high rigidity portion 5a of the suspension member 5 in the vehicle front-rear direction. The vehicle mounting structure for the electric unit 1 according to the present embodiment further includes the generator 4 which is fixed to the high rigidity portion 10a of the side member 10 and has a separate structure from the electric unit 1.

According to such a configuration, the generator 4 is fixed to the high rigidity portion 10a outside a region of the low rigidity portion 10b which is bent to the inner side of the vehicle at the time of the vehicle collision, and thus interference between the generator 4 and the side member 10 which is bent to the inner side of the vehicle can be avoided. In addition, the generator 4 is disposed at a position overlapping with the high rigidity portion 5a where breakage does not occur in the vehicle front-rear direction, and thus interference between the suspension member 5 and the generator 4 can also be avoided due to the breakage at the time of the vehicle collision. Further, the electric unit 1 is formed separately from not only the generator 4 but also the internal combustion engine that drives the generator 4, and thus the electric unit 1 is accordingly reduced in weight, and is easily moved upward at the time of the vehicle collision. As a result, it is easy to avoid the interference between the inverter 2 and the side member 10.

The vehicle mounting structure for the electric unit 1 according to the present embodiment further includes the high-voltage connector 4b connected to the generator 4, and the high-voltage connector 4b is disposed below the side member 10.

According to such a configuration, interference between the high-voltage connector 4b and the side member 10 can also be avoided.

Although the embodiment of the present invention has been described above, the above-mentioned embodiment is merely a part of application examples of the present invention, and does not mean that the technical scope of the present invention is limited to the specific configurations of the above-mentioned embodiment.

For example, in the above-described embodiment, a case where the inverter 2 is disposed above the side member 10 has been described. However, the inverter 2 may be partially disposed above the side member 10, and in this case, a portion of the inverter 2 above the side member 10 may include the high-voltage bus bar 2b. The high-voltage bus bar 2b may be a high-voltage bus bar connected to the generator 4 or a high-voltage bus bar connected to a battery.

According to such a configuration, the side member 10 can also be avoided from interfering with the high-voltage bus bar 2b which is most desired to avoid the interference with the side member 10 from the viewpoint of ensuring insulation.

The invention claimed is:

1. An assembly for a vehicle, the assembly comprising:
a vehicle mounting structure comprising:
a side member, and
a suspension member configured to extend in a front-rear direction of the vehicle, the suspension member comprising a high rigidity portion having a shape extending obliquely in a rearward and downward direction of the vehicle and a low rigidity portion extending rearward from a rear end of the high rigidity portion,
an electric unit comprising an inverter and a first motor; and
a generator fixed to the side member, wherein a height of a lower-most portion of the generator is less than a height of a lower-most portion of the first motor, wherein;
the side member comprises a curved portion having an upwardly convex curved shape,
a plane perpendicular to the front-rear direction of the vehicle passes through the curved portion and the inverter vehicle front-rear direction, and
the electric unit is fixed to the low rigidity portion.

2. The assembly according to claim 1, wherein the inverter is disposed above the side member.

3. The assembly according to claim 1, wherein the inverter comprises a high-voltage terminal connection portion and is partially located above the side member, and
a portion of the inverter located above the side member comprises the high-voltage terminal connection portion.

4. The assembly according to claim 1, wherein the side member comprises a second high rigidity portion, the plane is a first plane,
the second high rigidity portion and the first high rigidity portion intersect with a second plane perpendicular to the front-rear direction of the vehicle, and
the generator is fixed to the second high rigidity portion of the side member and has a separate structure from the electric unit.

5. The assembly according to claim 4, further comprising:
a high-voltage connector connected to the generator, wherein
the high-voltage connector is disposed below the side member.

* * * * *